(12) United States Patent
Beattie et al.

(10) Patent No.: US 12,043,993 B2
(45) Date of Patent: Jul. 23, 2024

(54) ABLUTIONARY INSTALLATION

(71) Applicant: Kohler Mira Limited, Gloucestershire (GB)

(72) Inventors: Colin Beattie, Gloucestershire (GB); Stuart Banham, Gloucestershire (GB)

(73) Assignee: KOHLER MIRA LIMITED, Cheltenham (GB)

( * ) Notice: Subject to any disclaimer, the term of this patent is extended or adjusted under 35 U.S.C. 154(b) by 0 days.

(21) Appl. No.: 17/108,632

(22) Filed: Dec. 1, 2020

(65) Prior Publication Data

US 2021/0079632 A1   Mar. 18, 2021

Related U.S. Application Data

(63) Continuation of application No. PCT/GB2019/051528, filed on Jun. 3, 2019.

(30) Foreign Application Priority Data

Jun. 3, 2019   (GB) ..................... 1809214

(51) Int. Cl.
*E03C 1/02*   (2006.01)
*E03C 1/04*   (2006.01)
*E03C 1/044*  (2006.01)
*E03C 1/06*   (2006.01)
*F16K 11/044* (2006.01)

(52) U.S. Cl.
CPC ............ *E03C 1/023* (2013.01); *E03C 1/0408* (2013.01); *E03C 1/044* (2013.01); *E03C 1/06* (2013.01); *F16K 11/0445* (2013.01)

(58) Field of Classification Search
CPC ........ E03C 1/023; E03C 1/06; E03C 2201/30; F16K 11/0445
See application file for complete search history.

(56) References Cited

U.S. PATENT DOCUMENTS

| | | |
|---|---|---|
| 1,054,572 A | 2/1913 | Langley |
| 1,148,970 A | 8/1915 | King |
| 1,360,381 A | 11/1920 | Edwards |
| 1,807,900 A | 6/1931 | Dougherty |
| 3,967,783 A | 7/1976 | Halsted et al. |
| 5,353,448 A * | 10/1994 | Lee .......................... E03C 1/00 4/597 |
| 5,918,811 A | 7/1999 | Denham et al. |
| 6,256,808 B1 | 7/2001 | Graham et al. |

(Continued)

FOREIGN PATENT DOCUMENTS

| | | |
|---|---|---|
| CN | 201992137 U | 9/2011 |
| CN | 202151605 | 2/2012 |

(Continued)

OTHER PUBLICATIONS

European Official Action dated Jan. 27, 2023, issued in corresponding European application.

*Primary Examiner* — Reinaldo Sanchez-Medina
(74) *Attorney, Agent, or Firm* — Husch Blackwell LLP

(57) ABSTRACT

A diverter for use in a shower system, the diverter having a diverter inlet and at least two diverter outlets. The diverter inlet is provided with a diverter inlet fitting adapted to be connected to a hose or pipe. The diverter inlet fitting is freely movable about an axis of the diverter.

21 Claims, 9 Drawing Sheets

(56) References Cited

U.S. PATENT DOCUMENTS

| | | | |
|---|---|---|---|
| 7,299,510 B2* | 11/2007 | Tsai | E03C 1/023 |
| | | | 4/615 |
| 8,066,204 B2* | 11/2011 | Petrovic | B05B 1/1618 |
| | | | 239/443 |
| 8,082,610 B2 | 12/2011 | Henry et al. | |
| 8,191,185 B2* | 6/2012 | Tsai | E03C 1/06 |
| | | | 4/615 |
| 9,347,208 B2* | 5/2016 | Quinn | F16K 11/085 |
| 2001/0023901 A1 | 9/2001 | Haverstraw et al. | |
| 2002/0035752 A1 | 3/2002 | Gransow et al. | |
| 2005/0116062 A1 | 6/2005 | Yang | |
| 2006/0131445 A1 | 6/2006 | Petrovic et al. | |
| 2006/0138253 A1 | 6/2006 | Petrovic et al. | |
| 2006/0207667 A1 | 9/2006 | Nikles et al. | |
| 2006/0242759 A1 | 11/2006 | Tsai | |
| 2007/0221277 A1 | 9/2007 | Hubmann | |
| 2008/0083844 A1 | 4/2008 | Leber et al. | |
| 2008/0250556 A1* | 10/2008 | Mang | E03C 1/0408 |
| | | | 239/289 |
| 2009/0206178 A1 | 8/2009 | Nobili | |
| 2009/0276953 A1* | 11/2009 | Hsu | E03C 1/0408 |
| | | | 239/447 |
| 2010/0037389 A1 | 2/2010 | Gross | |
| 2011/0030823 A1 | 2/2011 | Seal et al. | |
| 2012/0086199 A1 | 4/2012 | Macan et al. | |
| 2014/0209708 A1* | 7/2014 | Tsai | B05B 1/18 |
| | | | 4/615 |
| 2015/0136245 A1* | 5/2015 | Hong | E03C 1/06 |
| | | | 137/356 |
| 2017/0157634 A1 | 6/2017 | Johnson | |

FOREIGN PATENT DOCUMENTS

| | | |
|---|---|---|
| CN | 104879979 A | 9/2015 |
| DE | 10 2007 007 408 | 8/2008 |
| GB | 1 481 071 | 7/1977 |
| GB | 2 404 719 | 2/2005 |
| GB | 2 463 936 | 4/2010 |
| GB | 2 466 504 | 6/2010 |
| GB | 2 480 291 | 11/2011 |
| GB | 2 552 369 | 1/2018 |
| WO | WO-99/59456 | 11/1999 |
| WO | WO-2019/234399 | 12/2019 |

* cited by examiner

ABLUTIONARY INSTALLATION

CROSS-REFERENCE TO RELATED PATENT APPLICATIONS

This application is a Continuation of International Application No. PCT/GB2019/051528 filed Jun. 3, 3019, which claims the benefit of and priority to United Kingdom Priority Patent Application No. GB 1809214.8, filed Jun. 5, 2018. The entire disclosures of International Application No. PCT/GB2019/051528 and United Kingdom Priority Patent Application No. GB 1809214.8, including their specifications, drawings, claims and abstracts, are incorporated herein by reference.

BACKGROUND

The present disclosure relates to ablutionary installations for washing and parts thereof and more especially to ablutionary installations for showering and parts thereof.

When installing a shower system, the shower system is connected at one or more connection points to a plumbing system configured to supply water to the shower system. A significant portion of the plumbing system may generally be hidden from view, e.g. behind or within walls and floors of a building. The connection points, which typically may protrude from a wall, are provided at only certain locations. Adding further connection points or moving existing connection points is not a simple task. The location and arrangement of the connection point(s) are generally fixed or at least not readily alterable. Thus, the generally fixed location and arrangement of the connection point(s) may limit options when installing or replacing a shower system.

US2017/0157634A1 discloses an on-wall shower system that is configured to be retrofit to existing in-wall shower plumbing. To assist in installation, the on-wall shower system provides for adjustability of an upper mount, for adjustability of a lower mount, and/or for axial height adjustment.

BRIEF DESCRIPTION OF THE DRAWINGS

Example embodiments will now be described with reference to the accompanying drawings, in which.

DETAILED DESCRIPTION

Figure 1:
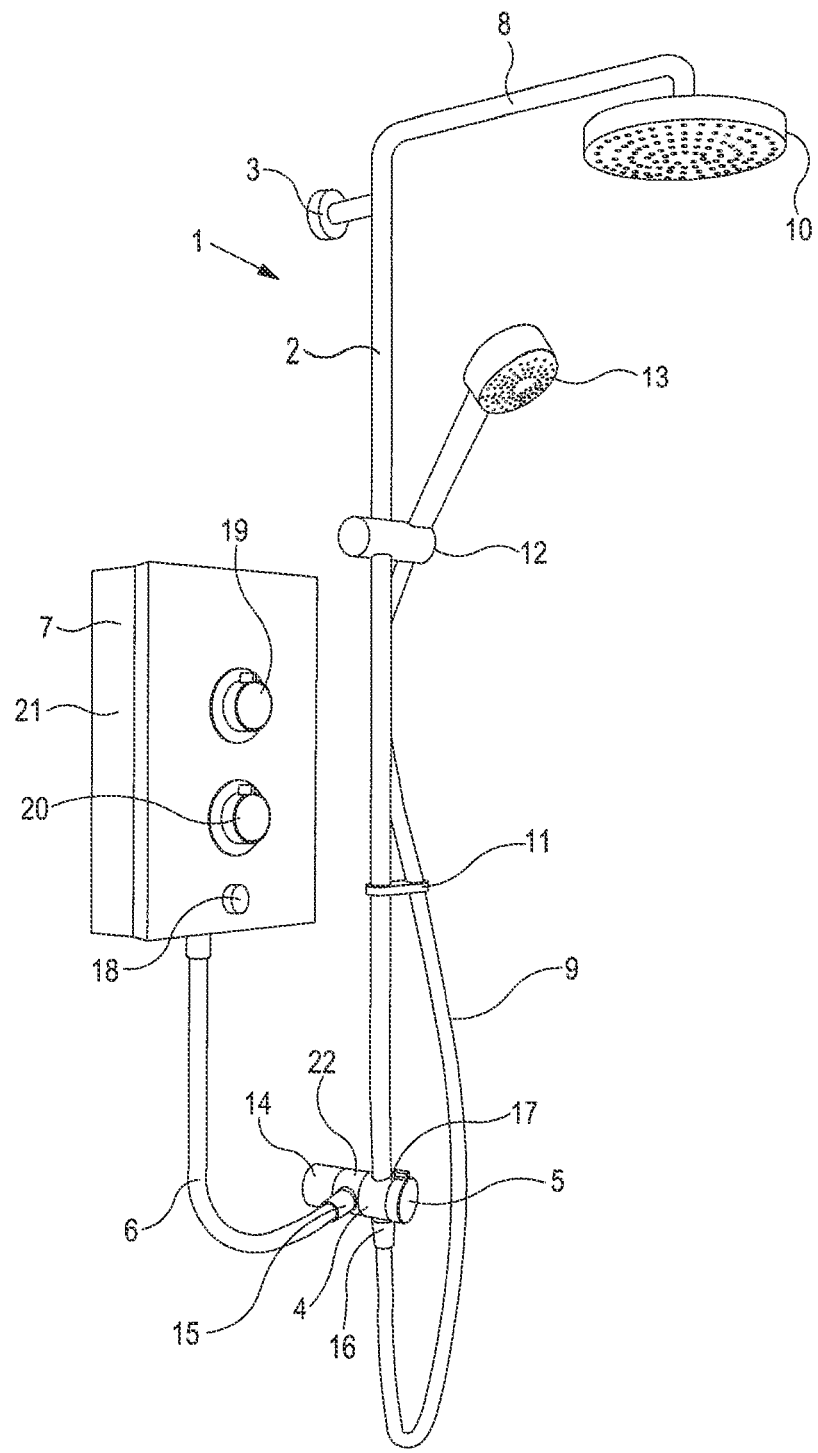
FIG. 1 shows a shower system.
Figure 2:
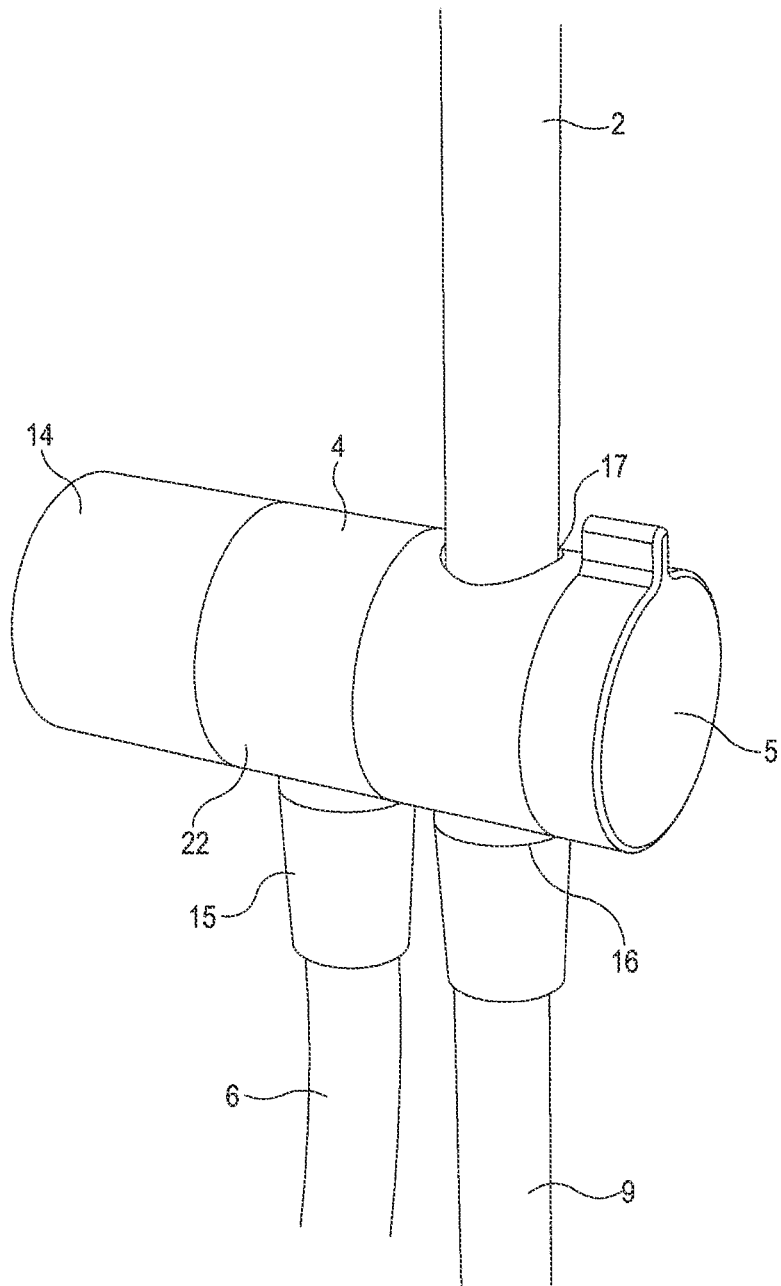
FIG. 2 shows a diverter.
Figure 3:
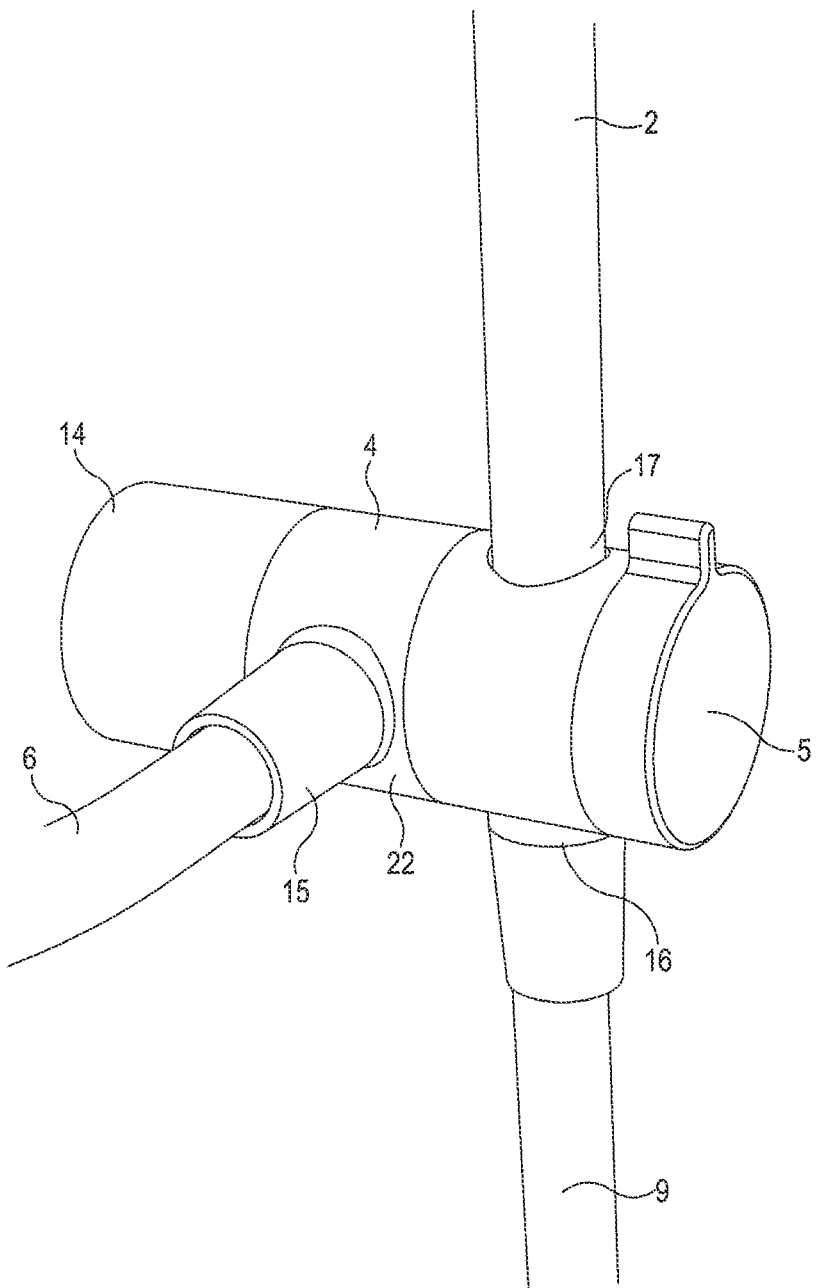
FIG. 3 shows the diverter of FIG. 2 in a different configuration.

A first aspect provides a diverter for use in a shower system, the diverter having a diverter inlet and at least two diverter outlets. The diverter inlet is provided with a diverter inlet fitting adapted to be connected to a hose or pipe. The diverter inlet fitting is freely movable about an axis of the diverter.

The diverter inlet fitting may be freely movable in an arc about the axis of the diverter. Hence, the diverter inlet fitting may be movable along an arcuate path. The arcuate path may lie in a plane which is not parallel with the axis of the diverter.

The diverter inlet fitting may be freely movable within a bounded arc. Alternatively, the diverter inlet fitting may be freely movable about the axis of the diverter without any limitation to the extent of rotation, i.e. in an unbounded arc about the axis of the diverter.

An axis of the diverter inlet fitting may be at an angle to (i.e. non-parallel to) the axis of the diverter. The angle between the axis of the diverter inlet fitting and the axis of the diverter may be at least 20°, at least 30° at least 45° and/or up to 90°. For example, the axis of the diverter inlet fitting may be perpendicular to the axis of the diverter.

The diverter inlet fitting may extend, e.g. protrude, in a direction at an angle to (i.e. non-parallel to) the axis of the diverter. The angle between the direction the diverter inlet fitting extends, e.g. protrudes, and the axis of the diverter may be at least 20°, at least 30° at least 45° and/or up to 90°. For example, the diverter inlet fitting may extend, e.g. protrude, in a radial direction away from the axis of the diverter.

By the diverter inlet fitting being freely movable about an axis of the diverter, the diverter may be more versatile, since it may be installed in shower systems having a wider variety of configurations of components.

Between the diverter inlet and the diverter outlets the diverter may comprise a diverter valve operable to select any one of the diverter outlets. The diverter valve may comprise a movable valve member disposed at least partially within a valve chamber.

The diverter may comprise a control member operably connected to the valve member, the control member being operable to cause movement of the valve member within the valve chamber to select any one of the diverter outlets.

The valve chamber may have a valve chamber inlet and two or more valve chamber outlets, each valve chamber outlet being in communication with one of the diverter outlets.

The diverter inlet may communicate with an least partially annular chamber, which communicates with the valve chamber inlet such that there is provided a fluid flow path from the diverter inlet to the valve chamber for any possible position of the freely movable diverter inlet fitting.

The control member may be a rotatable control member such as a control knob.

The valve member may be arranged to move longitudinally within the valve chamber. The valve member may comprise a shuttle.

The control member may be rotatable about an axis coincident with or parallel with a direction of movement, e.g. longitudinal movement, of the valve member within the valve chamber.

The diverter valve may be configured such that the valve member cannot be positioned to prevent water flow.

The diverter valve may be configured so that the flow rate is substantially unchanged during changeover from one outlet to another.

A second aspect provides a diverter for use in a shower system, the diverter having a diverter inlet and at least two diverter outlets. Between the diverter inlet and the diverter outlets the diverter comprises a diverter valve operable to select any one of the diverter outlets, the diverter valve comprising a movable valve member disposed at least partially within a valve chamber. The diverter further comprises a control member operably connected to the valve member, the control member being operable to cause movement of the valve member within the valve chamber to select any one of the diverter outlets. The valve chamber has a valve chamber inlet and two or more valve chamber outlets, each valve chamber outlet being in communication with one of the diverter outlets. The diverter inlet is provided with a diverter inlet fitting adapted to be connected to a hose or pipe. The diverter inlet fitting is freely movable about an axis of the diverter. The diverter inlet communicates with an least partially annular chamber, which communicates with the valve chamber inlet such that there is provided a fluid flow path from the diverter inlet to the valve chamber for any possible position of the freely movable diverter inlet fitting.

The diverter inlet fitting may be freely movable in an arc about the axis of the diverter. Hence, the diverter inlet fitting may be movable along an arcuate path. The arcuate path may lie in a plane which is not parallel with the axis of the diverter.

The diverter inlet fitting may be freely movable within a bounded arc. Alternatively, the diverter inlet fitting may be freely movable about the axis of the diverter without any limitation to the extent of rotation, i.e. in an unbounded arc about the axis of the diverter.

An axis of the diverter inlet fitting may be at an angle to (i.e. non-parallel to) the axis of the diverter. The angle between the axis of the diverter inlet fitting and the axis of the diverter may be at least 20°, at least 30° at least 45° and/or up to 90°. For example, the axis of the diverter inlet fitting may be perpendicular to the axis of the diverter.

The diverter inlet fitting may extend, e.g. protrude, in a direction at an angle to (i.e. non-parallel to) the axis of the diverter. The angle between the direction the diverter inlet fitting extends, e.g. protrudes, and the axis of the diverter may be at least 20°, at least 30° at least 45° and/or up to 90°. For example, the diverter inlet fitting may extend, e.g. protrude, in a radial direction away from the axis of the diverter.

The control member may be a rotatable control member such as a control knob.

The valve member may be arranged to move longitudinally within the valve chamber. The valve member may comprise a shuttle.

The control member may be rotatable about an axis coincident with or parallel with a direction of movement, e.g. longitudinal movement, of the valve member within the valve chamber.

The diverter valve may be configured such that the valve member cannot be positioned to prevent water flow.

The diverter valve may be configured so that the flow rate is substantially unchanged during changeover from one outlet to another.

A third aspect provides a shower fitting comprising: a riser bar, the riser bar having an upper end; and an overhead arm having a first end and a second end, the first end being adapted to be attached to the upper end of the riser bar and the second end being adapted to be attached to an overhead showerhead. When the first end of the overhead arm is attached to the upper end of the riser bar, the overhead arm is arranged and oriented such that the overhead showerhead is located a distance laterally away from the riser bar. The first end of the overhead arm and the upper end of the riser bar are adapted such that they permit the position of the overhead showerhead to be selected, e.g. during installation, between a plurality of positions about an axis of the riser bar.

The riser bar may be attachable to a surface such as a wall,

In one example embodiment, the first end of the overhead arm and the upper end of the riser bar may be adapted such that they can be attached together in a plurality of discrete angular orientations, e.g. two, three, four, five, six, eight, nine, 10, 12, 15, 20 or 30 discrete angular orientations.

Alternatively, the first end of the overhead arm and the upper end of the riser bar may be adapted such that the overhead arm can be moved through, and fixed at any point in, a bounded arc about the axis of the riser bar. For example, the bounced arc may comprise 45°, 60°, 90° or 120° of arc.

The riser bar may have a lower end, the lower end being adapted to be attached to a diverter outlet.

A first supply pipe may be concealed in the riser bar. A second supply pipe in communication with the first supply pipe may be concealed in the overhead arm.

One or more of the riser bar and/or the overhead arm may itself/themselves comprise a supply pipe.

A fourth aspect provides an ablutionary installation comprising a shower system comprising a diverter according to the first aspect, a diverter according to the second aspect and/or a shower fitting according to the third aspect.

The ablutionary installation may employ an instantaneous water heater. The instantaneous water heater may be disposed upstream of the or a diverter.

In the instantaneous water heater, a supply of cold water may be heated at the time of use by passage through a heater tank, typically by means of one or more electric heating elements positioned within the tank so that the water flows over the heating elements as it passes through the tank.

Showers employing an instantaneous water heater containing one or more electric heating elements may generally be termed electric showers.

The instantaneous water heater may comprise a casing housing a heater tank for heating water flowing through the heater tank. The casing may be adapted to be attached to a surface such as a wall.

A hose or pipe may provide fluid communication between an outlet of the instantaneous water heater and the diverter inlet. The hose or pipe may be flexible at least in part.

The shower system may comprise one or more sprayheads. The one or more sprayheads may comprise at least one handshower and/or an overhead shower.

The shower system may comprise a bracket mounted on the or a riser bar, the bracket being adapted to support the handshower. The bracket may allow the height and angle of the spray from the handshower to be adjusted. The handshower may also be detached from the bracket and held in the hand for directing the spray from the handshower as desired.

Another aspect provides a kit of parts arranged to be assembled to form a diverter, a shower fitting or an ablutionary system as described herein.

Installing or replacing a shower system may be facilitated by use of a diverter according to the first aspect or the second aspect and/or a shower fitting according to the third aspect.

The person skilled in the art will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

FIG. 1 shows an example of a shower system 1 comprising a diverter 4. FIGS. 2, 3, 4 and 5 show the diverter 4 in more detail. Like reference numerals are used to represent like features.

The shower system 1 comprises an instantaneous water heater 7. The instantaneous water heater 7 comprises a casing 21, which houses a heater tank for heating water flowing through the heater tank. The casing 21 is attached to a wall. The instantaneous water heater 7 is connected to a connection point (not shown) of an at least partially hidden plumbing system (not shown), the connection point protruding from the wall. The plumbing system connects the instantaneous water heater 7 to a supply of cold water.

The instantaneous water heater 7 is operable to heat water from the supply of cold water at the time of use by passage through the heater tank. Typically, water may be heated in the heater tank by means of one or more electric heating elements positioned within the tank so that the water flows over the heating element(s) as it passes through the tank.

The instantaneous water heater 7 is provided with a control button 18 operable to turn the shower system 1 on and off. The instantaneous water heater 7 is provided with a first control dial 19 and a second control dial 20. The first control dial 19 is operable to control the flow of water and the second control dial 20 is operable to control water temperature. Alternatively, the second control dial 209 may be operable to control the flow of water and the first control dial 19 is operable to control water temperature.

The first control dial 19 is located above the second control dial 20, which is located above the control button 18. The first control dial 19, the second control dial 20 and the control button 18 are provided on a front panel of the casing 21.

Figure 4:
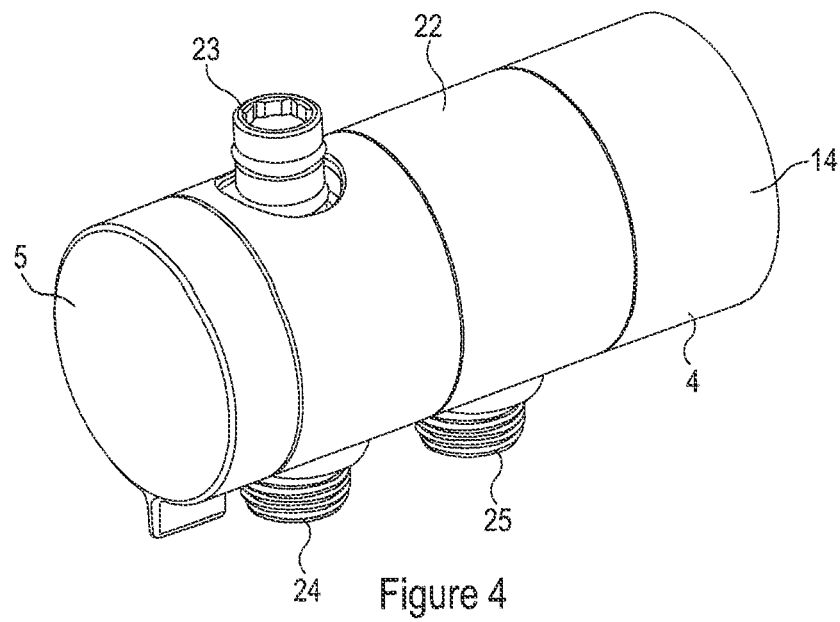
FIG. 4 is another view of the diverter of FIGS. 2 and 3.
Figure 5:
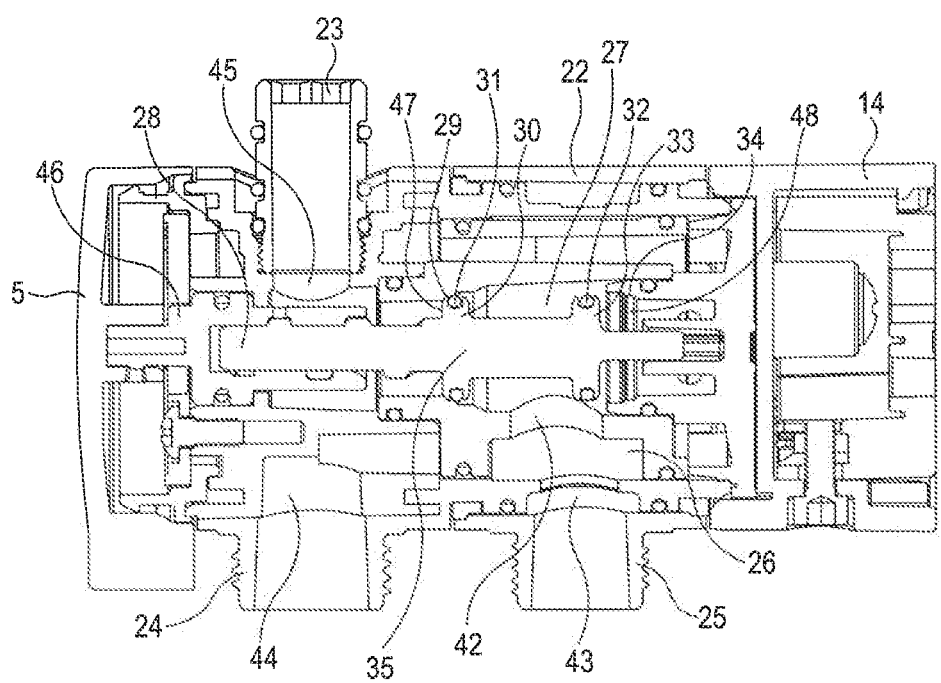
FIG. 5 is a longitudinal cross-section through the diverter of FIGS. 2 to 4.

The diverter 4 has a generally cylindrical form and comprises at a first end a base portion 14 adapted to be fixed to a surface such as a wall, e.g. using mechanical fasteners such as screws or adhesive. A freely rotatable portion 22 of the diverter 4 is adjacent the base portion 14. The freely rotatable portion 22 is freely rotatable about a longitudinal axis of the diverter 4. The freely rotatable portion 22 comprises a diverter inlet 43 (FIG. 5) with a diverter inlet fitting 25 (FIGS. 4 and 5).

At a second end of the diverter 4, there is a rotatable control member 5. The control member 5 comprises a control knob, which is rotatable about the longitudinal axis of the diverter 4. The control member 5 is coupled to a diverter valve 28 (FIG. 5) operable to select between a first diverter outlet 45 (FIG. 5) and a second diverter outlet 44 (FIG. 5).

A flexible hose or pipe 6 provides fluid communication between the instantaneous water heater 7 and the diverter 4. An end connector 15 connects the flexible hose or pipe 6 to the diverter inlet fitting 25.

The first diverter outlet 45 is connected via a first diverter outlet fitting 23 (FIGS. 4 and 5) to a lower end 17 of a riser bar 2 extending upwards from the diverter 4. A riser bar mount 3 connects the riser bar 2 to the wall at a location towards an upper end of the riser bar 2. An overhead arm 8 has a first end connected to the upper end of the riser bar 2. A second end of the overhead arm 8 is connected to an overhead showerhead 10. The overhead showerhead 10 is located a distance laterally away from the riser bar 2. The riser bar 2 and the overhead arm 8 together form a supply pipe providing fluid communication from the diverter 4 to the overhead showerhead 10.

The second diverter outlet 44 is connected via a second diverter outlet fitting 24 (FIGS. 4 and 5) to a shower hose 9. The shower hose 9 is flexible and provides fluid communication from the diverter 4 to a handshower 13. An end connector 16 connects the shower hose 9 to the second diverter outlet fitting 24. The shower hose 9 passes through a retaining loop 11 attached to the riser bar 2; the riser bar 2 can be split into two sections which are joined at the retaining loop 11. A bracket 12 is mounted on the riser bar. The bracket 12 allows the height and angle of the spray from the handshower 13 to be adjusted. The handshower 13 can also be detached from the bracket 12 and held in the hand for directing the spray from the handshower 13 as desired.

The freely rotatable portion 22 comprises the diverter inlet 43 with the diverter inlet fitting 25. The end connector 15 connects the flexible hose or pipe 6 to the diverter inlet fitting 25 in a watertight manner. The first diverter outlet 45 has the first outlet fitting 23. The lower end 17 of the riser bar 2 is connected to the first outlet fitting 23 in a watertight manner. The second diverter outlet 44 has the second outlet fitting 24. The end connector 16 connects the shower hose 9 to the second outlet fitting 24 in a watertight manner.

The freely rotatable portion can rotate freely in an arc (i.e. along an arcuate path) about the longitudinal axis of the diverter. As a consequence, given a hose or pipe of a particular length, the diverter can be mounted on a wall at a wider variety of locations relative to the wall-mounted instantaneous water heater. This may be beneficial since the location of the wall-mounted instantaneous water heater will be determined by the fixed location of the connection point for connecting the instantaneous water heater to the plumbing system that supplies water to the shower system. When installing or replacing a shower system, the user may thus have more options in terms of overall shower system design and configuration, e.g. in terms of size and location of a shower tray or bath tub in which the user would stand during use of the shower system. This versatility may help to make installation or replacement of a shower system easier, since the requirement for cutting the hose or pipe to length may be reduced if not eliminated.

By the hose or pipe connecting the instantaneous water heater to the diverter also being flexible, the diverter can be mounted on a wall at an even wider variety of locations relative to the wall-mounted instantaneous water heater, given a hose or pipe having a particular length. This may be beneficial since the location of the wall-mounted instantaneous water heater will be determined by the fixed location of the connection point for connecting the instantaneous water heater to the plumbing system that supplies water to the shower system. When installing or replacing a shower system, the user may thus have even more options in terms of overall shower system design and configuration, e.g. in terms of size and location of a shower tray or bath tub in which the user would stand during use of the shower system. This additional versatility may help to make installation or replacement of a shower system even easier, since the requirement for cutting the hose or pipe to length may be reduced if not eliminated.

The internal structure and operation of the diverter 4 will now be described with reference in particular to FIG. 5. The diverter inlet 43 communicates with an annular chamber 26 disposed within the freely rotatable portion 22. Radially inward of the annular chamber 26 is a valve chamber 27. A valve chamber inlet 42 provides fluid communication between the annular chamber 26 and the valve chamber 27. The valve chamber 27 extends in a direction along the longitudinal axis of the diverter 4.

A first valve chamber outlet 47 having a first valve seat 29 is located at a first end of the valve chamber 27. A second valve chamber outlet 48 having a second valve seat 34 is located at a second end of the valve chamber 27. The first valve chamber outlet 47 is in fluid communication with the first diverter outlet 45. The second valve chamber outlet 48 is in fluid communication with the second diverter outlet 44.

The diverter valve 28 comprises a valve member 35. The valve member 35 is an elongate member which extends along the longitudinal axis of the diverter 4 through the valve chamber 27. The valve member 35 is coupled to the rotatable control member 5 by a rotary pin 28 such that when the rotatable control member 5 is rotated the valve member 35 is caused to move longitudinally within the valve chamber 27.

The valve member 35 has thereon a first sealing flange 30 with a first o-ring 29 fitted thereto. A longitudinal distance from the first sealing flange 30, the valve member 35 has thereon a second sealing flange 33 with a second o-ring 32 fitted thereto. Longitudinal movement of the valve member 35 caused by rotation of the rotatable control member 5 brings the first sealing flange 30 into and out of engagement with the first valve seat 29 thereby varying and/or shutting off flow to the first valve chamber outlet 47 (and hence the overhead shower 10). Longitudinal movement of the valve member 35 caused by rotation of the rotatable control member 5 also brings the second sealing flange 33 into and out of engagement with the second valve seat 34 thereby varying and/or shutting off flow to the second valve chamber outlet 48 (and hence the handshower 13). The valve member 35 is configured such that turning the rotatable control knob 5 through 180° selects between one of the first valve chamber outlet 47 and the second valve chamber outlet 48 being fully open and the other being closed. The diverter valve 28 is configured such that it is not possible for both of the first valve chamber outlet 47 and the second valve chamber outlet 48 to be closed at the same time. Accordingly, the diverter valve 28 does not shut off. During operation, there is always water flowing through the diverter valve, i.e. either to the handshower, the overhead shower or to both the handset or the overhead shower. The diverter valve 28 is configured such that flow through the diverter is substantially unchanged when a user selects between shower modes, i.e. the handset and the overhead shower.

The diverter 4 may be suitable for use in an electric shower system. However, it may be employed in a non-electric shower system, e.g. in a system employing a mixer valve.

Figure 6:
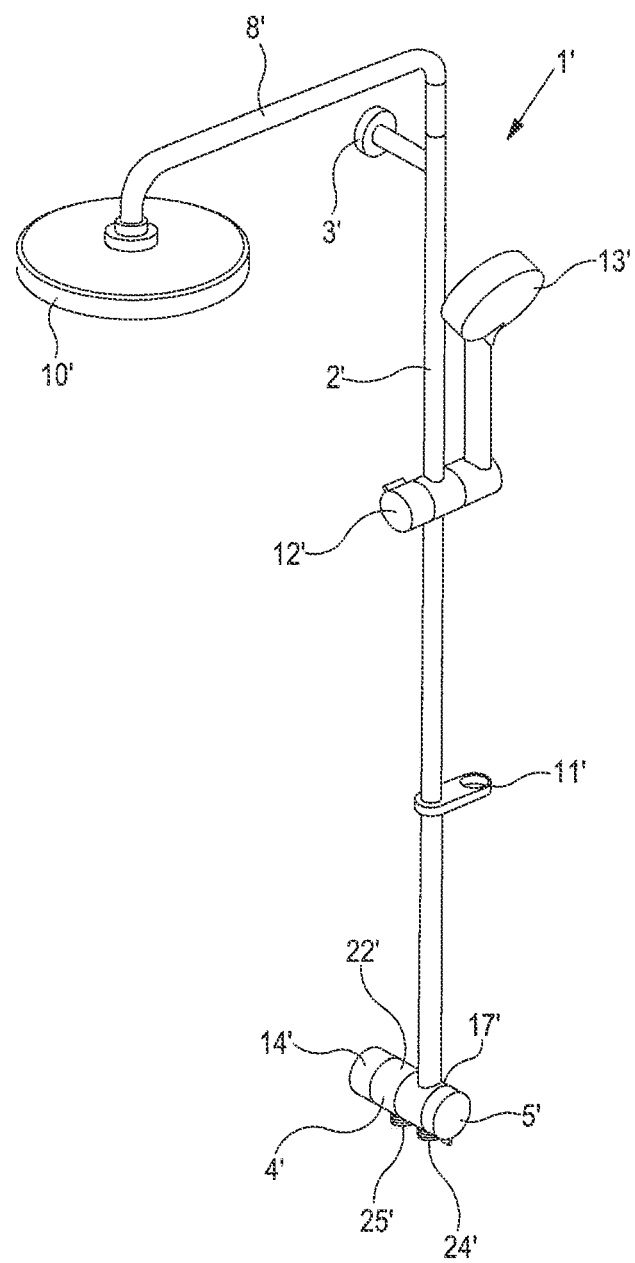
FIG. 6 shows another shower system.
Figure 7:
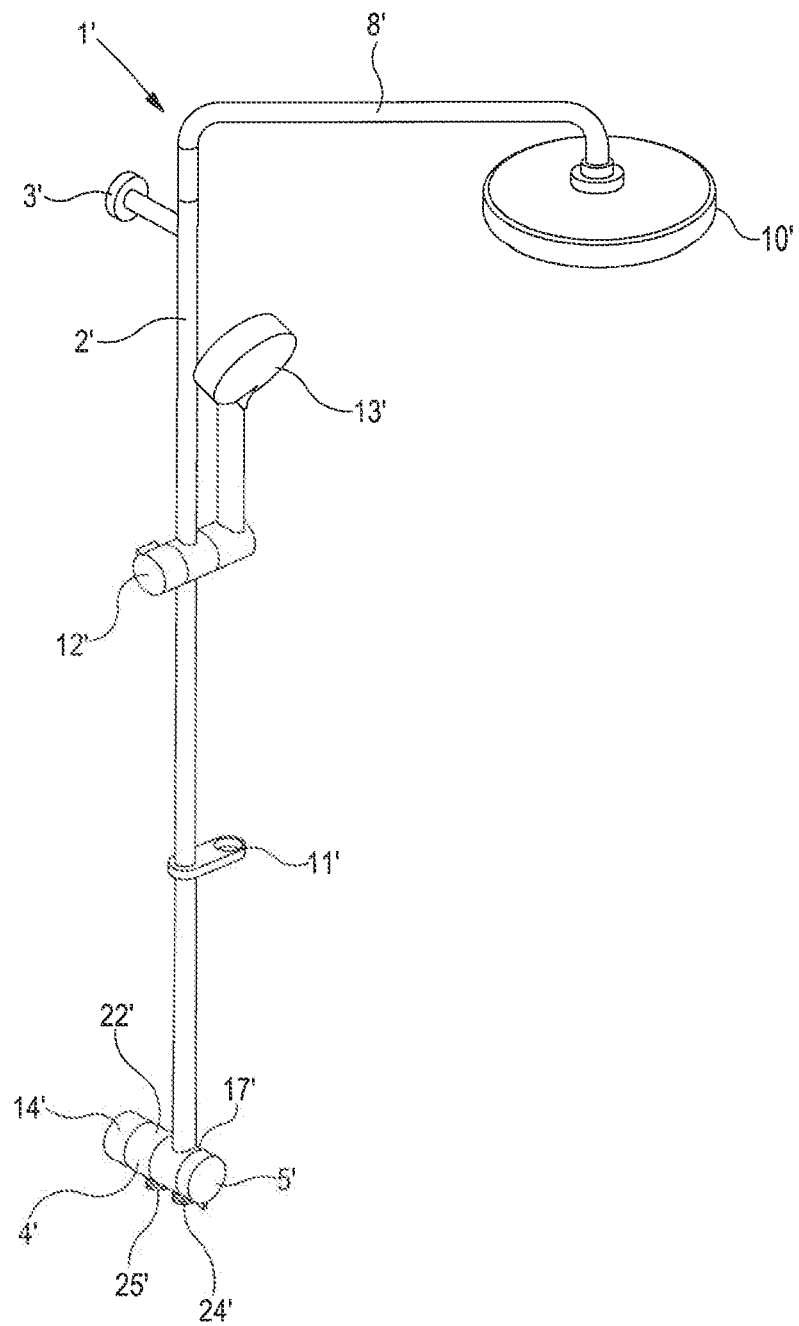
FIG. 7 shows the shower system of FIG. 6 in a different configuration.

FIGS. 6 and 7 show a shower system 1'. The shower system 1' may comprise an instantaneous water heater (not shown), which is connected to a plumbing system that connects the instantaneous water heater to a supply of cold water.

The shower system 1' comprises a diverter 4'. The diverter 4' has a generally cylindrical form and comprises at a first end a base portion 14' adapted to be fixed to a surface such as a wall, e.g. using mechanical fasteners such as screws or adhesive. A freely rotatable portion 22' of the diverter 4' is adjacent the base portion 14'. The freely rotatable portion 22' is freely rotatable in an arc (i.e. along an arcuate path) about a longitudinal axis of the diverter 4'. The freely rotatable portion 22' comprises a diverter inlet (not shown) with a diverter inlet fitting 25'.

At a second end of the diverter 4', there is a rotatable control member 5'. The control member 5' comprises a control knob, which is rotatable about the longitudinal axis of the diverter 4'. The control member 5' is coupled to a diverter valve operable to select between a first diverter outlet and a second diverter outlet.

A flexible hose or pipe (not shown) may provide fluid communication between the instantaneous water heater and the diverter 4'. An end connector may connect the flexible hose or pipe to the diverter inlet fitting 25'.

The first diverter outlet is connected via a first diverter outlet fitting to a lower end 17' of a riser bar 2' extending upwards from the diverter 4'. A riser bar mount 3' connects the riser bar 2' to the wall at a location towards an upper end of the riser bar 2'. An overhead arm 8' has a first end connected to the upper end of the riser bar 2'. A second end of the overhead arm 8' is connected to an overhead showerhead 10'. The overhead showerhead 10' is located a distance laterally away from the riser bar 2'. The riser bar 2' and the overhead arm 8' together form a supply pipe providing fluid communication from the diverter 4' to the overhead showerhead 10'. The first end of the overhead arm 8' and the upper end of the riser bar 2' are adapted such that they permit the position of the overhead showerhead 10' to be selected, e.g. during installation, between a plurality of positions about an axis of the riser bar 2'. This is described in more detail below. In FIG. 7 the first end of the overhead arm 8' and the upper end of the riser bar 2' are attached together in a different angular orientation from FIG. 6.

The second diverter outlet may be connected via a second diverter outlet fitting 24' to a shower hose (not shown). The shower hose may be flexible and may provide fluid communication from the diverter 4' to a handshower 13'. An end connector may connect the shower hose to the second diverter outlet fitting 24'. The shower hose may pass through a retaining loop 11' attached to the riser bar 2'. A bracket 12' is mounted on the riser bar 2'. The bracket 12' allows the height and angle of the spray from the handshower 13' to be adjusted. The handshower 13' can also be detached from the bracket 12' and held in the hand for directing the spray from the handshower 13' as desired.

The diverter 4' may operate in substantially the same manner has the diverter 4 in the shower system 1 described in relation to FIGS. 1 to 5.

The shower system 1' may not comprise a diverter having a different structure and/or mode of operation. The shower system 1' may not comprise a diverter.

The shower system 1' may not comprise the handshower 13', the retaining loop 11' and/or the bracket 12'.

Figure 8:
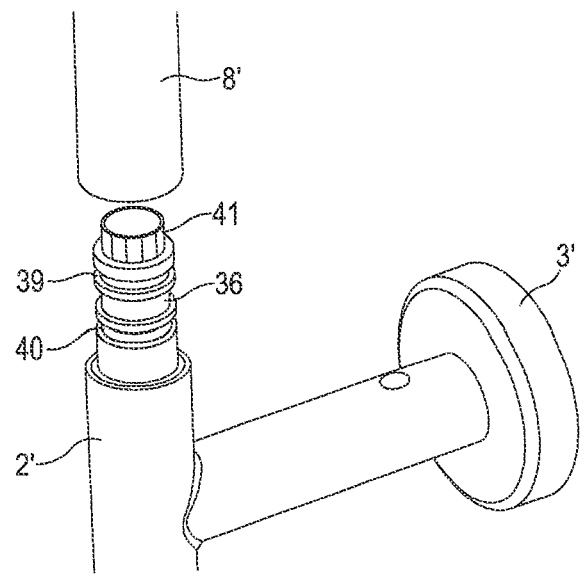
FIG. 8 shows a close-up view of a portion of a shower fitting.
Figure 9:
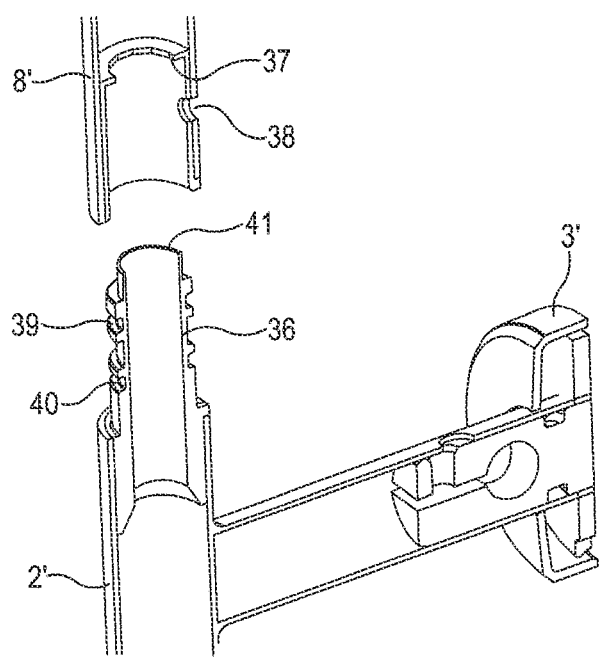
FIG. 9 shows a cross-section through the portion of the shower fitting of FIG. 8.

FIGS. 8 and 9 show a portion of a shower fitting employed in the shower system 1' of FIGS. 6 and 7. An upper portion of the riser bar 2' is shown, which is attachable to a surface such as a wall by means of the riser bar mount 3'.

An insert 36 is received in the upper end of the riser bar 2'. The insert 36 has a longitudinal bore and extends out of the upper end of the riser bar 2'. The insert 36 may comprise, or consist essentially of, a metal material. At its upper end, the insert 36 has an outer surface 41 formed of 12 faces. The perimeter of the outer surface 41 has the form of a regular 12-sided polygon. The insert 36 comprises a first circumferential groove 39 and a second circumferential groove 40. The first circumferential groove 39 and the second circumferential groove 40 are each adapted to receive an o-ring.

The first end of the overhead arm 8' has an insert 37 therein. The insert 37 may comprise, or consist essentially of, a metal material. The insert 37 is configured to receive the insert 36. A portion of the inner surface of the insert 37 is configured to complement the outer surface 41 of the insert 36. Accordingly, the riser bar 2' and the overhead arm 8' may be connected together in 12 discrete orientations. From a given one of the 12 discrete orientations to the next one of the 12 discrete orientations corresponds to a rotation of 30° about a longitudinal axis of the riser bar 2'. An aperture 38 passes through the overhead arm 8' and the insert 37. A grub screw (not shown) may be employed in the aperture 38 to secure the overhead arm 8' in place and fix it in a desired orientation.

The upper end of the riser bar and the first end of the overhead arm may be adapted, e.g. using inserts, such that they can be attached together in a plurality of discrete angular orientations, e.g. two, three, four, five, six, eight, nine, 10, 12, 15, 20 or 30 discrete angular orientations. The plurality of discrete angular orientations may correspond to regular or irregular angular intervals about the longitudinal axis of the riser bar.

For instance, the outer surface of the insert in the upper end of the riser bar may have a perimeter corresponding to an equilateral triangle, a square, a regular pentagon, a regular hexagon, a regular octagon, a regular nonagon, a regular decagon, a regular 12-sided polygon, a regular 20-sided polygon or a regular 30-sided polygon.

Figure 10:
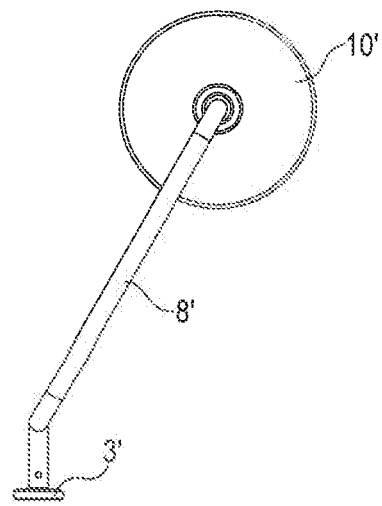
FIG. 10 is a top view of a shower system comprising a shower fitting such as the shower fitting of FIGS. 8 and 9.

FIG. 10 is a top view of the shower system 1' comprising the shower fitting of FIGS. 8 and 9. As can be seen, with the riser bar mount 3' attached to a wall, the overhead arm 8' is connected to the riser bar such that it is not perpendicular to the wall. The overhead showerhead 10' is thus located at an angular from a normal to the wall.

Figure 11:
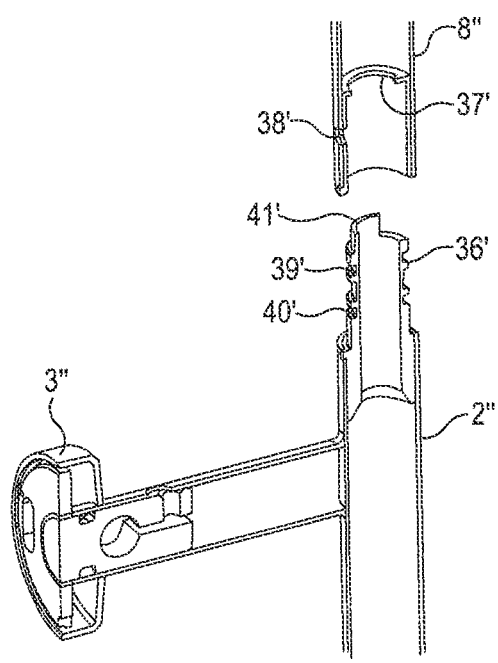
FIG. 11 a cross-section through a portion of another shower fitting.

FIG. 11 shows a portion of another shower fitting suitable for being employed in a shower system. An upper portion of a riser bar 2" is shown, which is attachable to a surface such as a wall by means of the riser bar mount 3".

An insert 36' is received in the upper end of the riser bar 2". The insert 36' has a longitudinal bore and extends out of the upper end of the riser bar 2". The insert 36' may comprise, or consist essentially of, a plastic material. At its upper end, the insert 36' has a longitudinally extending protrusion 41'. The insert 36' comprises a first circumferential groove 39' and a second circumferential groove 40'. The first circumferential groove 39' and the second circumferential groove 40' are each adapted to receive an o-ring.

A first end of an overhead arm 8" has an insert 37' therein. The insert 37' may comprise, or consist essentially of, a plastic material. The insert 37' is configured to receive the insert 36'. A portion of the inner surface of the insert 37 is configured to receive the longitudinally extending protrusion 41' of the insert 36 such that, in use, rotation of the longitudinally extending protrusion 41' is limited to a bounded arc about a longitudinal axis of the riser bar 2". The bounded arc may comprise for example 45°, 60°, 90° or 120° of arc. An aperture 38 passes through the overhead arm 8' and the insert 37. A grub screw (not shown) may be employed in the aperture 38 to secure the overhead arm 8' in place and fix it in a desired orientation. Accordingly, the riser bar 2' and the overhead arm 8' may be connected together, and fixed at, any point in the bounded arc. The bounded arc may comprise for example 45°, 60°, 90° or 120° of arc.

Accordingly, the riser bar 2' and the overhead arm 8' may be connected together in 12 discrete orientations. From a given one of the 12 discrete orientations to the next one of the 12 discrete orientations corresponds to a rotation of 30° about a longitudinal axis of the riser bar 2'. An aperture 38 passes through the overhead arm 8' and the insert 37. A grub screw (not shown) may be employed in the aperture 38 to secure the overhead arm 8' in place and fix it in a desired orientation.

Figure 12:
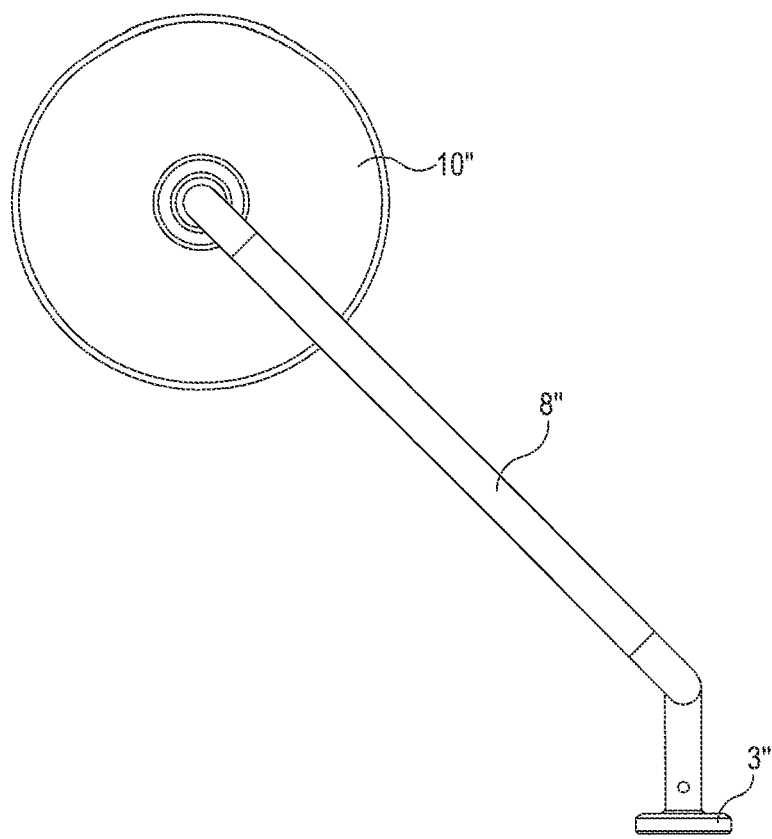
FIG. 12 is a top view of a shower system comprising a shower fitting such as the shower fitting of FIG. 11.

FIG. 12 is a top view of a comprising the shower fitting of FIG. 11. As can be seen, with the riser bar mount 3" attached to a wall, the overhead arm 8"' is connected to the riser bar such that it is not perpendicular to the wall. The overhead showerhead 10" is thus located at an angular from a normal to the wall.

The shower fittings discussed above may be employed in any shower system, e.g. the shower system 1 of FIG. 1 or the shower system 1' of FIGS. 6 and 7. Hence, for example, in the shower system 1 of FIG. 1, the first end of the overhead arm 8 and the upper end of the riser bar 2 may be adapted such that they permit the position of the overhead showerhead 10 to be selected, e.g. during installation, between a plurality of positions about an axis of the riser bar 2.

Providing a shower fitting, in which the first end of the overhead arm and the upper end of the riser bar are adapted such that they permit the position of the overhead showerhead to be selected between a plurality of positions about an axis of the riser bar may allow a user to install or replace an overhead shower in a wider range of locations. Accordingly, when installing or replacing a shower system, the user may thus have more options in terms of overall shower system design and configuration, e.g. in terms of size and location of a shower tray or bath tub in which the user would stand during use of the overhead shower. This versatility may help to make installation or replacement of the overhead shower easier.

An embodiment of the diverter described herein and an embodiment of the shower fitting described herein may be employed singly or together in a shower system. In either case, when installing or replacing the shower system, the user may have the benefit of many options in terms of overall shower system design and configuration. In a shower system comprising both an embodiment of the diverter described herein and an embodiment of the shower fitting described herein, when installing or replacing the shower system, the user may have the benefit of an increased number of options in terms of overall shower system design and configuration.

The present disclosure may be applicable to any kind of shower system, not just electric shower systems.

It will be understood that the invention is not limited to the embodiments above-described and various modifications and improvements can be made without departing from the concepts herein. Except where mutually exclusive, any of the features may be employed separately or in combination with any other features and the disclosure extends to and includes all combinations and sub-combinations of one or more features described herein.

What is claimed is:

1. A diverter for use in a shower system, the diverter having a diverter inlet and at least two diverter outlets, the diverter inlet being provided with a diverter inlet fitting adapted to be connected to a hose or pipe, wherein the diverter inlet and the diverter inlet fitting are freely movable about an axis of the diverter and rotatable with respect to at least one of the at least two diverter outlets, wherein an axis of the diverter inlet fitting is non-parallel to the axis of the diverter, wherein a first of the at least two diverter outlets is in fluid communication with a showerhead and a second of the at least two diverter outlets is in fluid communication with a handshower.

2. The diverter according to claim 1, wherein, between the diverter inlet and the diverter outlets the diverter comprises a diverter valve operable to select any one of the diverter outlets.

3. The diverter according to claim 2, wherein the diverter valve comprises a movable valve member disposed at least partially within a valve chamber.

4. The diverter according to claim 3, further comprising a control member operably connected to the valve member, the control member being operable to cause movement of the valve member within the valve chamber to select any one of the diverter outlets.

5. The diverter according to claim 3, wherein the diverter inlet communicates with an at least partially annular chamber, which communicates with the valve chamber such that there is provided a fluid flow path from the diverter inlet to the valve chamber for any possible position of the freely movable diverter inlet fitting.

6. The diverter according to claim 4, further comprising a first valve seat corresponding to a first outlet of the at least two diverter outlets and a second valve seat corresponding to a second outlet of the at least two diverter outlets, wherein the control member is operable to cause engagement of the valve member with at least one of the first valve seat or the second valve seat.

7. The diverter according to claim 6, wherein the first outlet corresponds to an overhead shower and the second outlet corresponds to a hand shower.

8. The diverter according to claim 6, wherein the control member is a knob.

9. The diverter according to claim 1, wherein an axis of the diverter inlet fitting is at an angle to the axis of the diverter and/or wherein the diverter inlet fitting extends in a direction at an angle to the axis of the diverter.

10. The diverter according to claim 9, wherein the angle is between 20 degrees and 90 degrees.

11. The diverter according to claim 1, wherein the diverter is part of an ablutionary installation comprising a shower system.

12. The diverter according to claim 11, wherein the ablutionary installation includes an instantaneous water heater.

13. The diverter according to claim 1, wherein:
(1) the diverter inlet fitting is freely movable in an arc about the axis of the diverter,
(2) the diverter inlet fitting is freely movable within a bounded arc, or
(3) the diverter inlet fitting is freely movable about the axis of the diverter without any limitation to the extent of rotation.

14. A diverter for use in a shower system, the diverter having a diverter inlet and at least two diverter outlets, wherein:
between the diverter inlet and the diverter outlets the diverter comprises a diverter valve operable to select any one of the diverter outlets, the diverter valve comprising a movable valve member disposed at least partially within a valve chamber;
the diverter further comprises a control member operably connected to the valve member, the control member being operable to cause movement of the valve member within the valve chamber to select any one of the diverter outlets;
the valve chamber has a valve chamber inlet and two or more valve chamber outlets, each valve chamber outlet being in communication with one of the diverter outlets;
the diverter inlet is provided with a diverter inlet fitting adapted to be connected to a hose or pipe, the diverter inlet and the diverter inlet fitting being freely movable about an axis of the diverter and rotatable with respect to at least one of the at least two diverter outlets;
an axis of the diverter inlet fitting is non-parallel to the axis of the diverter, wherein a first of the at least two diverter outlets is in fluid communication with a first ablutionary outlet and a second of the at least two diverter outlets is in fluid communication with a second ablutionary outlet; and
the diverter inlet communicates with an least partially annular chamber, which communicates with the valve chamber inlet such that there is provided a fluid flow path from the diverter inlet to the valve chamber for any possible position of the freely movable diverter inlet fitting.

15. The diverter according to claim 14, wherein the diverter is a part of an ablutionary installation comprising a shower system.

16. The diverter according to claim 15, wherein the ablutionary installation includes an instantaneous water heater.

17. The diverter according to claim 14, wherein the control member comprises a rotatable control member.

18. The diverter according to claim 14, wherein the valve member is arranged to move longitudinally within the valve chamber.

19. The diverter according to claim 14, wherein:
(1) the diverter inlet fitting is freely movable in an arc about the axis of the diverter,
(2) the diverter inlet fitting is freely movable within a bounded arc, or
(3) the diverter inlet fitting is freely movable about the axis of the diverter without any limitation to the extent of rotation.

20. The diverter according to claim 14, wherein a first diverter outlet of the at least two diverter outlets is coupled to a first diverter outlet fitting, the first diverter outlet fitting being connected to an end of a riser bar, the riser bar being coupled to a wall.

21. A diverter for use in a shower system, the diverter having a diverter inlet and at least two diverter outlets, the diverter inlet being provided with a diverter inlet fitting adapted to be connected to a hose or pipe, wherein the diverter inlet and the diverter inlet fitting are freely movable about an axis of the diverter and rotatable with respect to at least one of the at least two diverter outlets, wherein an axis of the diverter inlet fitting is non-parallel to the axis of the diverter, wherein the diverter is separate from a showerhead and is positioned remotely from but in fluid communication with said showerhead.

* * * * *